US008713237B2

(12) United States Patent
Tang et al.

(10) Patent No.: US 8,713,237 B2
(45) Date of Patent: Apr. 29, 2014

(54) X2 10GBASE-T TRANSCEIVER WITH 1 GIGABIT SIDE-BAND SUPPORT

(75) Inventors: Norman Tang, Los Altos, CA (US); Liang Ping Peng, Santa Clara, CA (US); David Lai, Mountain View, CA (US); Anthony Nguyen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 356 days.

(21) Appl. No.: 13/074,664

(22) Filed: Mar. 29, 2011

(65) Prior Publication Data

US 2012/0254495 A1    Oct. 4, 2012

(51) Int. Cl.
*H05K 7/10* (2006.01)
*G06F 13/00* (2006.01)

(52) U.S. Cl.
USPC ............................ 710/301; 710/104; 710/316

(58) Field of Classification Search
USPC .......................................... 710/301, 104, 316
See application file for complete search history.

(56) References Cited

U.S. PATENT DOCUMENTS

| 7,467,319 | B1 * | 12/2008 | Kao et al. ..................... 713/500 |
| 7,564,873 | B1 * | 7/2009 | Zack et al. .................... 370/486 |
| 7,703,688 | B2 * | 4/2010 | Drabczuk et al. ............. 235/492 |
| 8,069,293 | B1 * | 11/2011 | Rogan et al. .................. 710/301 |
| 8,078,053 | B1 * | 12/2011 | Mazzini et al. ................ 398/28 |
| 2004/0088133 | A1 * | 5/2004 | Rabinovich .................... 702/122 |
| 2004/0187107 | A1 * | 9/2004 | Beverly et al. ................ 718/100 |
| 2006/0153238 | A1 * | 7/2006 | Bar-On et al. ................ 370/473 |
| 2006/0216958 | A1 * | 9/2006 | Yee et al. ........................ 439/66 |
| 2007/0147354 | A1 * | 6/2007 | He .................................. 370/352 |
| 2008/0052436 | A1 * | 2/2008 | Sharma et al. ................ 710/301 |
| 2008/0170586 | A1 * | 7/2008 | Huff et al. ..................... 370/463 |
| 2009/0041469 | A1 * | 2/2009 | Hofmeister et al. ........... 398/138 |
| 2009/0154467 | A1 * | 6/2009 | Diab ........................... 370/395.4 |
| 2009/0257754 | A1 * | 10/2009 | Theodoras et al. ............ 398/135 |
| 2010/0030910 | A1 * | 2/2010 | Pong ............................. 709/232 |
| 2010/0115295 | A1 * | 5/2010 | Diab ............................. 713/300 |

(Continued)

FOREIGN PATENT DOCUMENTS

JP         2006246459 A  *  9/2006  ............. H04B 10/02

OTHER PUBLICATIONS

"NN971013: Gigabit Speed Multi-Protocol Chip and Adapters for Network Computing", Oct. 1, 1997, IBM, IBM Technical Disclosure Bulletin, vol. 40, Iss. 10, pp. 13-16.*
Abe et al., "Short wave SFF small form factor transceivers," Electronic Components and Technology Conference, 2001. Proceedings., 51st , pp. 30,34, 2001.*
Yoshimura et al., "A 10Gbase Ethernet transceiver (LAN PHY) in a 1.8 V, 0.18 μm SOI/CMOS technology," Custom Integrated Circuits Conference, 2002. Proceedings of the IEEE 2002 , pp. 355,358, 2002.*
Gupta et al., "(Invited) 10GBASE-T for 10Gb/s full duplex ethernet LAN transmission over structured copper cabling," Radio Frequency Integrated Circuits Symposium, 2008. RFIC 2008. IEEE , pp. 203,206, Jun. 17, 2008-Apr. 17, 2008.*

*Primary Examiner* — Faisal M Zaman
(74) *Attorney, Agent, or Firm* — Edell, Shapiro & Finnan, LLC (57) ABSTRACT

An apparatus includes a transceiver device mounted on a printed circuit board and configured to selectively transmit and receive signals at a first data rate or signals at a second data rate. An X2 form factor pluggable connector disposed at one end of the printed circuit board includes first and second pins that respectively convey signals at the first and second data rates between the transceiver device and a system device. A port device disposed at an opposite end of the printed circuit board conveys signals between the transceiver device and a network device. A management circuit determines which of the first and second data rates is selected based on transmissions between the system device and the network device and controls the transceiver device to transmit and receive signal at the first data rate via the first pins and at the second data rate via the second pins.

19 Claims, 6 Drawing Sheets

(56) References Cited

U.S. PATENT DOCUMENTS

| | | | |
|---|---|---|---|
| 2010/0189168 A1* | 7/2010 | Booth et al. | 375/219 |
| 2010/0260201 A1* | 10/2010 | Yu et al. | 370/465 |
| 2010/0325432 A1 | 12/2010 | Tang et al. | |
| 2011/0040917 A1* | 2/2011 | Lambert et al. | 710/301 |
| 2011/0058777 A1* | 3/2011 | Gazzola et al. | 385/92 |
| 2011/0103792 A1* | 5/2011 | Kimura | 398/2 |
| 2011/0125930 A1* | 5/2011 | Tantos et al. | 710/8 |
| 2011/0150007 A1* | 6/2011 | Choi et al. | 370/503 |

\* cited by examiner

X2 10GBASE-T TRANSCEIVER WITH 1 GIGABIT SIDE-BAND SUPPORT

TECHNICAL FIELD

The present disclosure generally relates to an X2 form-factor pluggable transceiver module operable at a plurality of data transmission rates.

BACKGROUND

The 10GBASE-T standard is one of the primary technologies that drives 10 Gigabit per second rates of transmission for data center access. The 10GBASE-T standard reduces the economics of data center infrastructure with fewer cables, switches, and adapters. The 10GBASE-T standard also increases server virtualization density. The Institute of Electrical and Electronic Engineers (IEEE) sets forth standards for particular rates of data transmission. For example, IEEE 802.3an describes a 10GBASE-T standard for transmission of data at a nominal rate of 10 Gigabits per second over unshielded or shielded twisted-pair cables, over distances of up to 100 meters. The main objective of the 10GBASE-T standard is to provide a cost-effective and highly scalable 10 Gigabit Ethernet implementation over structured copper cabling infrastructure that is widely used in data centers. X2 form-factor pluggable devices allow for connectivity of customers over a system infrastructure via a pluggable connection.

DESCRIPTION OF EXAMPLE EMBODIMENTS

Overview

An apparatus is provided comprising a printed circuit board and a transceiver device mounted on the printed circuit board. The transceiver device is configured to selectively receive signals at a first data rate or signals at a second data rate. An X2 form factor pluggable connector is disposed at one end of the printed circuit board and comprises: first pins configured to convey signals at the first data rate between the transceiver device and a system device; and second pins configured to convey signals at the second data rate between the transceiver device and the system device. A port device is disposed at an opposite end of the printed circuit board and is configured to convey signals between the transceiver device and a network device. A management circuit mounted on the printed circuit board is configured to determine which of the first and second data rates is selected based on transmissions between the system device and the network device. The printed circuit board comprises signal paths coupling the first and second pins to the transceiver device. The management circuit is configured to control the transceiver device to transmit and receive signals via the first pins in response to the management circuit indicating the first data rate and to transmit and receive signals via the second pins in response to the management circuit indicating the second data rate.

Example Embodiments

Figure 1:
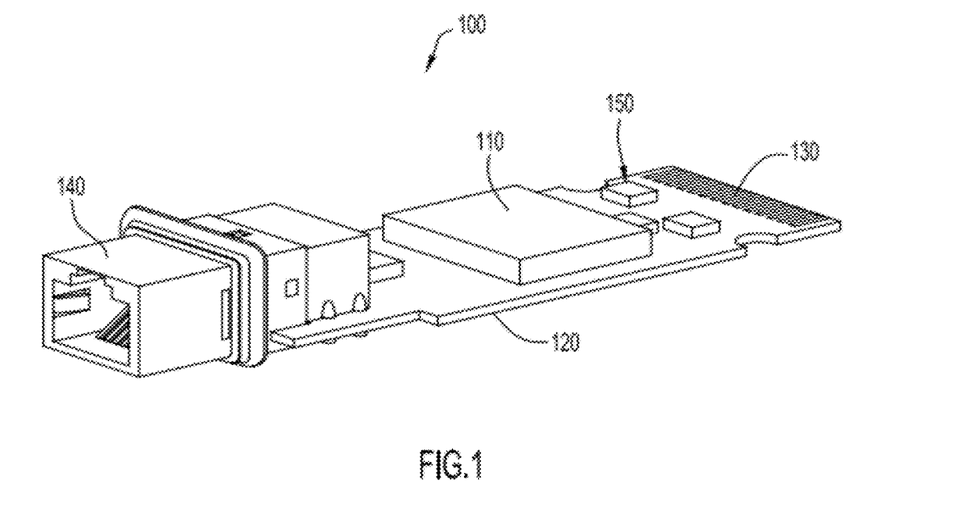
FIG. 1 is a perspective view of an X2 form factor transceiver module operable at a plurality of data transmission rates.

FIG. 1 is a perspective view of an X2 form factor transceiver module 100 showing the major components of the module. One or more integrated circuit chips constituting a transceiver device 110 are mounted on a multi-layer printed circuit board 120. Transceiver device 110 is configured to transmit and receive signals selectively at different data rates according to the techniques described herein. A pluggable connector 130 conforming to the X2 form factor is disposed at one longitudinal end of the printed circuit board 120. Pluggable connector 130 is configured to be slidably inserted into a port or socket of a system device (not shown). Pluggable device 130 comprises a transversely extending row of conductive contact pins or pads along the edge of printed circuit board 120. Different sets or groups of these pins are used to convey signals at different data rates between transceiver device 110 and the system device, as described in greater detail below.

A port device 140 is disposed at an opposing longitudinal end of printed circuit board 120. Printed circuit board 120 provides electrical signal paths between components of the X2 form factor pluggable module 100, including, but not limited to, transceiver device 110, pluggable connector 130, and port device 140. Thus, signals can be exchanged at one of a plurality of possible data rates between transceiver device 110, pluggable connector 130, and port device 140 through the electrical signal paths provided by printed circuit board 120. A management circuit 150 comprising one or more integrated circuits and/or discrete components is mounted on printed circuit board 120 and is configured to determine signal data rates according to the techniques described herein.

Port device 140 is configured to convey signals at one of a plurality of possible data rates between the transceiver device 110 and a network device (not shown), as described herein. Thus, the X2 form factor transceiver module 100 serves as an interface to enable data communication and signal exchange at one of a plurality of data rates between network devices and system devices while conforming to the pluggable X2 form factor.

Figure 2:
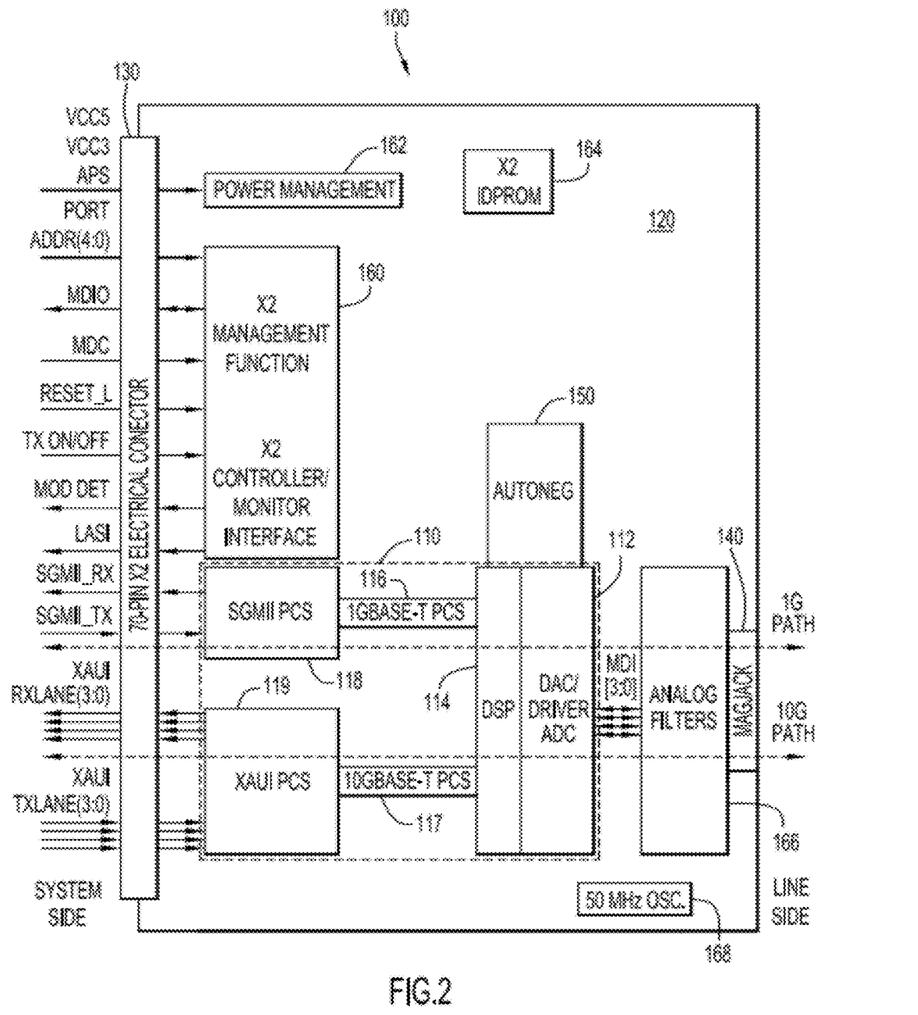
FIG. 2 is a block diagram depicting a first example of the functional components of the X2 form factor transceiver module.

FIG. 2 shows a functional block diagram depicting components of module 100 according to a first example. Port device 140 is disposed on the printed circuit board at one end of module 100, as described above. Port device 140 may interface with a transmission cable coupled to a network device (not shown) to convey signals between the network device and transceiver device 110. In one example, port device 140 may be a registered jack (RJ) 45 port device configured to receive a transmission cable (e.g., Ethernet) capable of supporting a plurality of data rates. Pluggable connector device 130 is disposed on printed circuit board 120 at the other end of module 100 and interfaces with an X2 compatible system port of a system device to convey signals at one of a plurality of data rates between the system device (not shown) and transceiver device 110. In accordance with the X2 form factor, pluggable connector 130 includes 70 pins to interface with the X2 port, of which certain pins are designated to convey signals between transceiver device 110 and the system device at a first data rate, and other, different pins are designated to convey signals between transceiver device 110 and the system device at a second data rate.

FIG. 2 also shows components of transceiver device 110 including a digital-to-analog converter (DAC)/driver analog-to-digital converter (Driver ADC) 112, a digital signal processor (DSP) 114, a 1GBASE-T physical coding sublayer (PCS) 116, a 10GBASE-T PCS 117, a Serial Gigabit Media Independent Interface (SGMII) PCS 118, and a 10 Gigabit Medium Attachment Unit Interface (XAUI) PCS 119. The SGMII PCS 118 of transceiver device 110 interfaces with dedicated SGMII pins on pluggable connector 130 for signal transmission while the XAUI PCS 119 of the transceiver device 110 interfaces with dedicated XAUI pins on the pluggable connector 130 for signal transmission.

As shown in FIG. 2, the 70-pin X2 electrical connector 130 includes first pins comprising eight input pins on four differential pair data lanes TXLANE(3:0) configured to receive an inbound 10GBASE-T signals from a connected system device and eight output pins on four differential pair data lanes RXLANE(3:0) configured to transmit outbound 10GBASE-T signals at a data rate of 10 Gigabits per second (herein "10G signals") to the system device (e.g., each XAUI differential pair data lane may be configured to support data transmission rates of up to 3.125 Gigabits per second between pluggable connector 130 and the X2 system port; thus, a 10G signal may be convey via parallel transmission of four 2.5 Gigabits per second signals). The eight first input pins on the four differential pair data lanes are respectively coupled via dedicated signal paths of printed circuit board 120 to eight first input pins of transceiver device 110 in a one-to-one correspondence. These signals are supplied to XAUI PCS 119 of transceiver device 110 on four differential pair data lanes Likewise, eight first output pins on four differential pair data lanes of transceiver device 110 are respectively coupled to the eight first output pins of connector 130 via dedicated signal paths of printed circuit board 120 to in a one-to-one correspondence. The eight first output pins of transceiver device 110 are supplied signals from XAUI PCS 119 of transceiver device 110 on four differential pair data lanes.

The 70-pin X2 electrical connector 130 further includes second pins comprising two differential input pins on a single differential pair data lane SGMII_TX configured to receive signals at a data rate of 1 Gigabit per second (herein "1G signals") from a connected system device and two differential output pins on a single differential pair data lane SGMII_RX configured to transmit 1G signals to the system device (e.g., the SGMII data lanes may be configured to support data transmission rates up to 1.25 Gigabits per second between pluggable connector 130 and the X2 system port). The second two input pins are respectively coupled via a dedicated signal path of printed circuit board 120 to a second two input pins of transceiver device 110, which supply the signals to SGMII PCS 118 on a single differential pair data lane Likewise, the second two output pins supplied by SGMII PCS 118 of transceiver device 110 on a single differential pair data lane are respectively coupled to the two second output pins of connector 130 via a dedicated signal path of printed circuit board 120. Thus, in this example, X2 form factor pluggable connector 130 includes separate first and second sets of pins for respectively conveying signals at first and second data rates (10G and 1G), and transceiver device 110 has input and output pins arranged in a one-to-one correspondence with the first and second pins of pluggable connector 130, which are coupled by respective dedicated signal paths of printed circuit board 120. Management circuit 150 instructs transceiver device as to which of the two data rates has been selected, such that signals conveyed between transceiver device 110 and the system device are processed via XAUI PCS 119 and 10GBASE-T PCS 117 or else by SGMII PCS 118 and 1GBASE-T PCS 116.

Management circuit 150 can be an auto-negotiation device configured to determine the data transmission rate of data signals to be conveyed based on auto-negotiate signals between the system and network devices. For example, the network device and system device may intend to transmit signals between one another at a first data rate of 10 Gigabits per second or at a second data rate of 1 Gigabit per second through module 100. Management circuit 150 determines the data transmission rate and supplies a control signal to transceiver device 110 instructing the transceiver device to transmit and receive signals at the selected data rate using the appropriate signal channels. Thus, transceiver module 100 enables dual rate communications of signals (e.g., either 1G or 10G signals) between the network device and the system device. Port device 140 conveys signals between transceiver device 110 and the network device regardless of the data rate.

FIG. 2 also shows various other components of the module 100, including an X2 management, controller, and monitor interface 160, a power management device 162, a memory device 164, an analog filter device 166, and an oscillator device 168.

Figure 3:
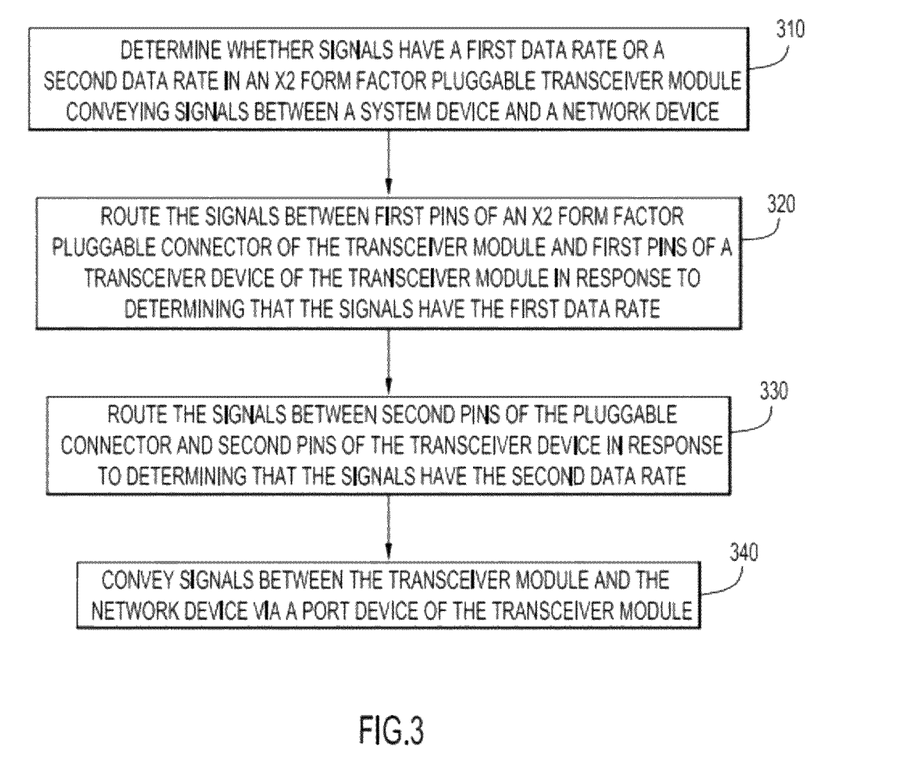
FIG. 3 is a flow diagram that depicts steps for operating the X2 form factor transceiver module according to the first example.

Operation of module 100 shown in FIG. 2 is summarized in the functional flow diagram of FIG. 3. In operation 310, a determination is made as to whether signals to be conveyed by an X2 form factor pluggable transceiver module between a system device and a network device have a first data rate or a second data rate. The signals are routed between first pins of an X2 form factor pluggable connector of the transceiver module and first pins of a transceiver device of the transceiver module in response to determining that the signals have the first data rate (operation 320), and the signals are routed between second pins of the pluggable connector and second pins of the transceiver device in response to determining that the signals have the second data rate (operation 330). In operation 340, signals are conveyed between the transceiver module and the network device via a port device of the transceiver module.

Figure 4:
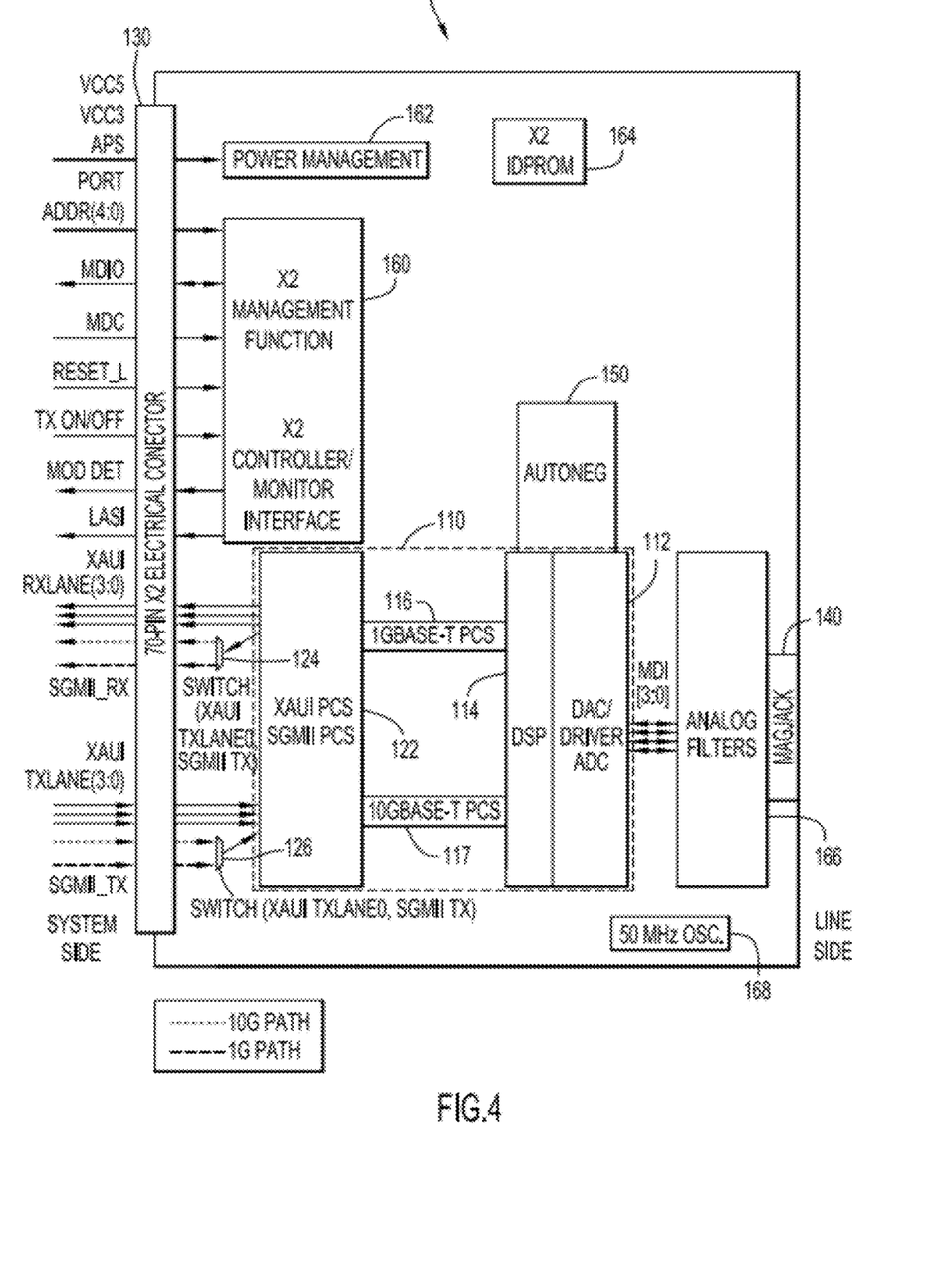
FIG. 4 is a block diagram depicting a second example of the functional components of the X2 form factor transceiver module.

A second example of components of module 100 is shown in the block diagram of FIG. 4, where like components are labeled with the same reference numerals as FIG. 2. In FIG. 4, pluggable connector 130, port device 140, management circuit 150, the X2 management, controller and monitor interface 160, power management device 162, memory 164, analog filter device 166, and oscillator 168 are essentially the same components as those depicted in FIG. 2. Specifically, the 70-pin X2 electrical connector 130 again includes first pins comprising eight input pins on four differential pair data lanes XAUI TXLANE(3:0) configured to receive 10GBASE-T signals from a connected system device and eight output pins on four differential pair data lanes XAUI RXLANE(3:0) configured to transmit 10GBASE-T signals to the system device, and second pins comprising two input pins on a single differential pair data lane SGMII_TX configured to receive 1G signals from the system device and two output pins on a single differential pair data lane SGMII_TX configured to transmit 1G signals to the system device. FIG. 4 also shows the transceiver device 110, of which the DAC/Driver ADC 112, DSP 114, 1GBASE-T PCS 116 and 10GBASE-T PCS 117 are the same components at those depicted for the transceiver device 110 in FIG. 2.

In FIG. 4, however, transceiver device 110 includes a single device 122 that operates as both the SGMII PCS and the XAUI PCS. In this case, transceiver device 110 includes only one set of eight input pins on four differential pair data lanes and one set of eight output pins on four differential pair data lanes, which respectively supply and receive signals from SGMII PCS/XAUI PCS 122. In particular, SGMII PCS/XAUI PCS 122 is designed to receive 10G signals via the eight input pins and to transmit 10G signals via the eight output pins. SGMII PCS/XAUI PCS 122 also uses two of the eight input pins on a single differential pair data lane to receive 1G signals and transmits 1G signals using two of the eight output pins on a single differential pair data lane. That is, two of the eight input pins of transceiver module 110 are shared SGMII/XAUI pins that receive both 1G signals and a portion of 10G signals, and two of the eight output pins of transceiver module 110 are shared SGMII/XAUI pins that transmit both 1G signals and a portion of 10G signals. Since, in this case, the data signal pin configuration of transceiver device 110 does not match that of the 70-pin X2 form factor pluggable connector 130, switches 124 and 126 that lie along signal paths of printed circuit board 120 are employed to appropriately route signals between transceiver device 110 and pluggable connector 130, depending on the selected data rate.

More specifically, six of the eight input pins of transceiver device 110 are respectively coupled via dedicated signal paths of printed circuit board 120 to six of the eight first input pins of pluggable connector 130 on three of the four differential pair data lanes (i.e., six of the eight TXLANE pins for receiving 10G signals). First switch 126 is disposed along signals paths of printed circuit board 120 and has a first input coupled to the first and second of the eight input pins of pluggable connector 130 corresponding to on one of the four XAUI TXLANE differential pair data lanes (i.e., the first and second of the eight XAUI TXLANE pins for receiving 10G signals). A second input of switch 126 is coupled to the two second input pins of pluggable connector 130 corresponding to the sing SGMII_TX differential pair data lane. (i.e., the SGMII_TX pin for receiving 1G signals). The output of switch 126 is coupled to the first and second input pins of transceiver device 110 on one of the four differential pair data lanes that supply signals to SGMII PCS/XAUI PCS 122 (i.e., the shared SGMII/XAUI input pins). In response to management circuit 150 indicating the 10G data rate, switch 126 is placed in a first state that selectively couples the first and second pins of the first input to the first and second input pins of transceiver device 110 such that the eight input pins of transceiver device 110 receive the 10G signal on the four differential pair data lanes that supply signals to the SGMII PCS/XAUI PCS 122 from the eight first input pins of pluggable connector 130. In response to management circuit 150 indicating the 1G data rate, switch 126 is placed in a second state that selectively couples the first and second pins of the second input to the first and second input pins of the transceiver device 110 such that six of the eight input pins of transceiver device 110 receive no signal, and the first and second input pin of transceiver device 110 receives the 1G signal on one of the four differential pair data lanes that supply signals to the SGMII PCS/XAUI PCS 122.

As shown in FIG. 4, six of the eight output pins of transceiver device 110 are respectively coupled via dedicated signal paths of printed circuit board 120 to six of the eight first output pins of pluggable connector 130 on three of the four differential pair data lanes (i.e., six of the eight XAUI RXLANE pins for transmitting 10G signals). Second switch 124 is disposed along signals paths of printed circuit board 120 and has its input connected to the first and second of the eight output pins of transceiver device 110 (i.e., the shared SGMII/XAUI output pins). A first output of switch 124 is coupled to the first and second of the eight first output pins of pluggable connector 130 corresponding to one of the four XAUI RXLANE differential pair data lanes (i.e., the first and second of the eight XAUI RXLANE pins for transmitting 10G signals). A second output of switch 124 is coupled to the two second output pins of pluggable connector 130 corresponding to the single SGMII_RX differential pair data lane (i.e., the SGMII_RX pin for transmitting 1G signals). In response to management circuit 150 indicating the 10G data rate, switch 124 is placed in a first state that selectively couples the first and second of the eight output pins of transceiver module 110 to the first and second of the eight first output pins of pluggable connector 130 such that the eight first output pins of pluggable connector receive a 10G signal from transceiver device 110. In response to management circuit 150 indicating the 1G data rate, switch 124 is placed in a second state that selectively couples the first and second of the eight output pins of transceiver device 110 to the two second output pins of pluggable connector 130 such that the two second output pins of pluggable connector 130 receive a 1G signal from transceiver device 110.

Figure 5:
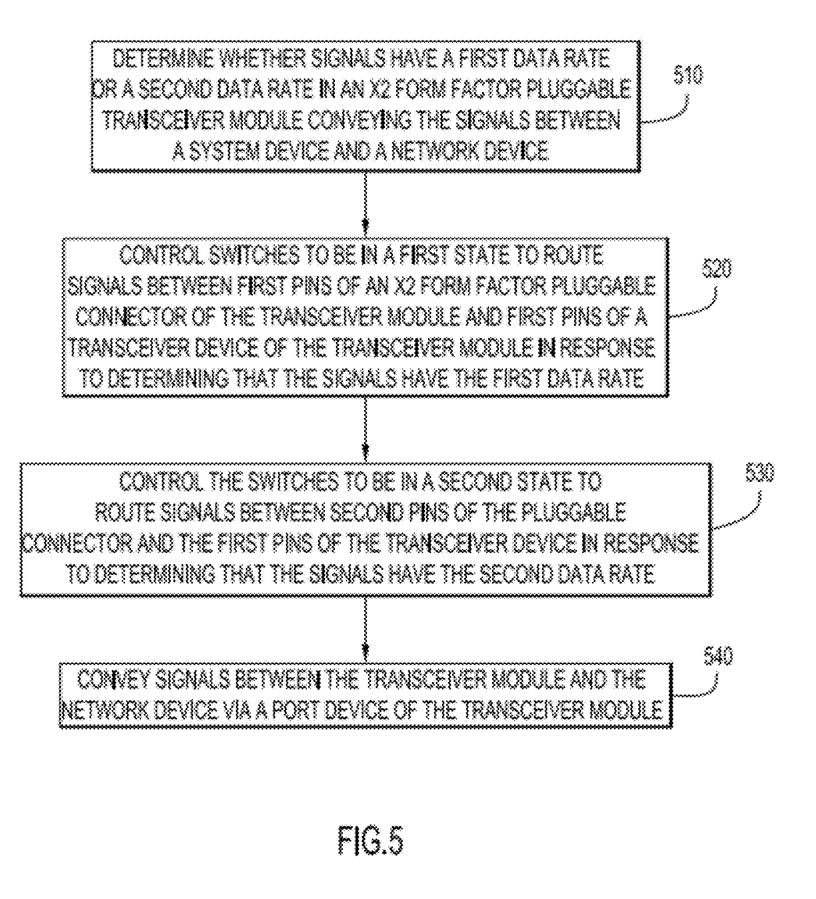
FIG. 5 is a flow diagram that depicts steps for operating the X2 form factor transceiver module according to the second example.

Operation of module 100 shown in FIG. 4 is summarized in the functional flow diagram of FIG. 5. In operation 510, it is determined in an X2 form factor pluggable transceiver module conveying the signals between a system device and a network device whether the signals have a first data rate or a second data rate. Switches are controlled to be in a first state to route signals between first pins of an X2 form factor pluggable connector of the transceiver module and first pins of a transceiver device of the transceiver module in response to determining that the signals have the first data rate (operation 520), and are controlled to be in a second state to route signals between second pins of the pluggable connector and the first pins of the transceiver device in response to determining that the signals have the second data rate (operation 530). In operation 540, signals are conveyed between the transceiver module and the network device via a port device of the transceiver module.

Figure 6:
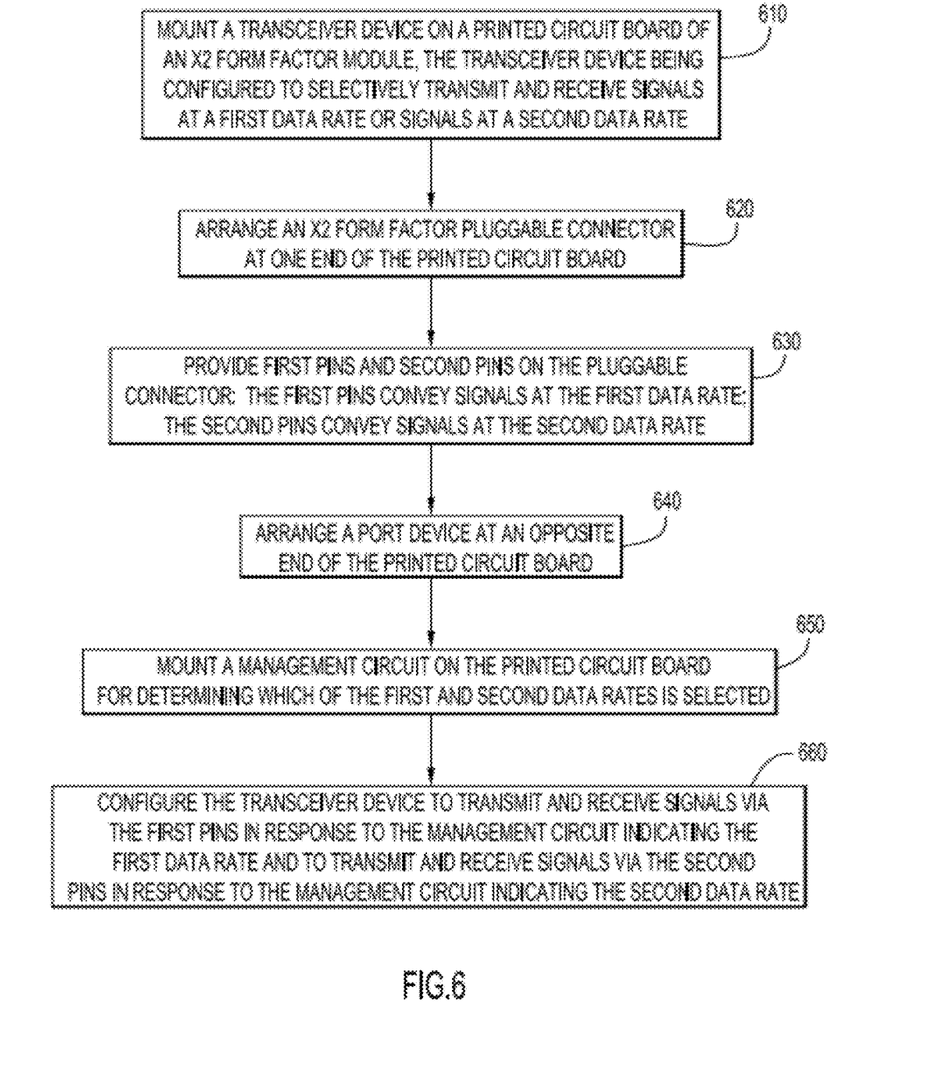
FIG. 6 is a functional flow diagram illustrating a process for manufacturing an X2 form factor transceiver module.

Operations performed to construct an X2 form factor pluggable transceiver module are summarized in FIG. 6. In operation 610, a transceiver device configured to selectively transmit and receive signals at a first data rate or signals at a second data rate is mounted on a printed circuit board of an X2 form factor module. An X2 form factor pluggable connector is arranged at one end of the printed circuit board (operation 620) and provided with first pins to convey signals at the first data rate and second pins to convey signals at the second data rate (operation 630). In operation 640, a port device is arranged at an opposite end of the printed circuit board. A management circuit is mounted on the printed circuit board for determining which of the first and second data rates is selected (operation 650), and the transceiver device is configured to transmit and receive signals via the first pins in response to the management circuit indicating the first data rate and to transmit and receive signals via the second pins in response to the management circuit indicating the second data rate (operation 660).

The above description is intended by way of example only. Various modifications and structural changes may be made therein without departing from the scope of the concepts described herein and within the scope and range of equivalents of the claims.

What is claimed is:
1. An apparatus comprising:
 a printed circuit board;
 a transceiver device mounted on the printed circuit board and configured to selectively transmit and receive signals at a first data rate according to a first Physical

Coding Sublayer (PCS) protocol or signals at a second data rate according to a second PCS protocol;

an X2 form factor pluggable connector configured to plug into an X2 port of a system device, the pluggable connector being disposed at one end of the printed circuit board and comprising: first dedicated pins configured to convey signals at the first data rate between the transceiver device and the system device, and second dedicated pins configured to convey signals at the second data rate between the transceiver device and the system device, wherein the second dedicated pins are distinct from the first dedicated pins;

a port device disposed at an opposite end of the printed circuit board and configured to receive a transmission cable, the transmission cable conveying signals at the first data rate or at the second data rate and conveying signals between the transceiver device and a network device; and a management circuit mounted on the printed circuit board and configured to determine which of the first and second data rates is selected based on transmissions between the system device and the network device;

wherein the printed circuit board comprises first dedicated signal paths coupling the first dedicated pins of the X2 form factor pluggable connector to the transceiver device and second dedicated signal paths coupling the second dedicated pins of the pluggable connector to the transceiver device, wherein no portions of the second dedicated signal paths overlap portions of the first dedicated signal paths, and the first and second dedicated pins of the X2 form factor pluggable connector have a one-to-one correspondence with pins of the transceiver device, the management circuit being configured to control the transceiver device to transmit and receive signals via the first dedicated pins at the first data rate and to transmit and receive signals via the second dedicated pins at the second data rate.

2. The apparatus of claim 1, wherein:
the first dedicated pins include eight input pins for conveying inbound signals on four differential data pair data lanes from the system device at the first data rate and eight output pins for conveying outbound signals on four differential pair data lanes from the transceiver device at the first data rate; and
the second dedicated pins include two input pins for conveying inbound signals on a single differential pair data lane from the system device at the second data rate and two output pins for conveying outbound signals on a single differential pair data lane from the transceiver device at the second data rate.

3. The apparatus of claim 1, wherein the pins of the transceiver device comprise:
first pins respectively coupled to the first dedicated pins of the pluggable connector via the first dedicated signal paths of the printed circuit board; and
second pins respectively coupled to the second dedicated pins of the pluggable connector via the second dedicated signal paths of the printed circuit board such that the first and second pins of the transceiver device have a one-to-one correspondence with the first and second dedicated pins of the pluggable connector.

4. The apparatus of claim 1, wherein the first dedicated pins of the pluggable connector are configured to support a 10 Gigabit Medium Attachment Unit Interface (XAUI) for signal transmission at the first data rate, and wherein the second dedicated pins of the pluggable connector are configured to support a Serial Gigabit Media Independent Interface (SGMII) for signal transmission at the second data rate.

5. The apparatus of claim 1, wherein the first dedicated pins of the pluggable connector are configured to convey signals at the first data rate of 10 Gigabits per second, and wherein the second dedicated pins of the pluggable connector are configured to convey signals at the second data rate of 1 Gigabit per second.

6. The apparatus of claim 1, further comprising a power management device mounted on the printed circuit board and configured to provide power to the apparatus.

7. The apparatus of claim 1, wherein the transceiver device is further configured to selectively transmit and receive analog signals to and from the network device at the first data rate or at the second data rate; and to transmit and receive digital signals to and from the system device at the first data rate or at the second data rate.

8. A method comprising:
in an X2 form factor pluggable transceiver module conveying signals between a system device and a network device, determining whether the signals have a first data rate or a second data rate;
conveying signals according to a first Physical Coding Sublayer (PCS) protocol between the transceiver module and the system device via first dedicated pins of an X2 form factor pluggable connector of the transceiver module in response to determining the signals have the first data rate;
conveying signals according to a second PCS protocol between the transceiver module and the system device via second dedicated pins of the X2 form factor pluggable connector of the transceiver module in response to determining the signals have the second data rate, wherein the second dedicated pins of the pluggable connector are distinct from the first dedicated pins of the X2 form factor pluggable connector; and
conveying signals between the transceiver module and the network device via a port device configured to receive a transmission cable, the transmission cable conveying signals at the first data rate or at the second data rate, of the transceiver module.

9. The method of claim 8, further comprising:
routing signals between the first dedicated pins of the X2 form factor pluggable connector and first pins of a transceiver device of the transceiver module via first dedicated signal paths in response to determining that the signals have the first data rate; and
routing signals between the second dedicated pins of the X2 form factor pluggable connector and second pins of the transceiver device of the transceiver module via second dedicated signal paths in response to determining that the signals have the second data rate, wherein no portions of the second dedicated signal paths overlap portions of the first dedicated signal paths, and the first and second dedicated pins of the X2 form factor pluggable connector have a one-to-one correspondence with the first and second pins of the transceiver device, respectively.

10. The method of claim 8, wherein:
conveying signals via the first dedicated pins of the X2 form factor pluggable connector comprises conveying signals via a 10 Gigabit Medium Attachment Unit Interface (XAUI) for signal transmission at the first data rate; and
conveying signals via the second dedicated pins of the X2 form factor pluggable connector comprises conveying signals via a Serial Gigabit Media Independent Interface (SGMII) for signal transmission at the second data rate.

11. The method of claim 8, wherein:
conveying signals via the first dedicated pins of the X2 form factor pluggable connector comprises conveying signals at the first data rate of 10 Gigabits per second; and
conveying signals via the second dedicated pins of the X2 form factor pluggable connector comprises conveying signals via at the second data rate of 1 Gigabit per second.

12. A method comprising:
mounting a transceiver device on a printed circuit board of an X2 form factor module, the transceiver device being configured to selectively transmit and receive signals at a first data rate according to a first Physical Coding Sublayer (PCS) protocol or signals at a second data rate according to a second PCS protocol;
arranging an X2 form factor pluggable connector at one end of the printed circuit board, the X2 form factor pluggable connector being configured to plug into an X2 port of a system device;
providing first dedicated pins and second dedicated pins on the X2 form factor pluggable connector, wherein the first dedicated pins are configured to convey signals at the first data rate between the transceiver device and the system device and the second dedicated pins are distinct from the first dedicated pins and configured to convey signals at the second data rate between the transceiver device and the system device;
arranging a port device at an opposite end of the printed circuit board, the port device being configured to receive a transmission cable, the transmission cable conveying signals at the first data rate or at the second data rate and conveying signals between the transceiver device and a network device;
mounting a management circuit on the printed circuit board, the management circuit being configured to determine which of the first and second data rates is selected based on transmissions between the system device and the network device; and
configuring the transceiver device to transmit and receive signals via the first dedicated pins in response to the management circuit indicating the first data rate and to transmit and receive signals via the second dedicated pins in response to the management circuit indicating the second data rate.

13. The method of claim 12, wherein:
providing the first dedicated pins includes providing eight input pins for conveying inbound signals from the system device at the first data rate and eight output pins for conveying outbound signals from the transceiver device at the first data rate; and
providing the second dedicated pins includes providing two input pins for conveying inbound signals from the system device at the second data rate and two output pins for conveying outbound signals from the transceiver device at the second data rate.

14. The method of claim 12, wherein:
the first dedicated pins of the X2 form factor pluggable connector are provided to support a 10 Gigabit Medium Attachment Unit Interface (XAUI) for signal transmission at the first data rate; and
the second dedicated pins of the X2 form factor pluggable connector are provided to support a Serial Gigabit Media Independent Interface (SGMII) for signal transmission at the second data rate.

15. The method of claim 12, wherein:
the first dedicated pins of the X2 form factor pluggable connector are provided to convey signals at the first data rate of 10 Gigabits per second; and
the second dedicated pins of the X2 form factor pluggable connector are provided to convey signals at the second data rate of 1 Gigabit per second.

16. The method of claim 12, further comprising mounting a power management device on the printed circuit board to provide power to the module.

17. The method of claim 12, further comprising selectively transmitting and receiving analog signals to and from the network device at the first data rate or at the second data rate; and transmitting and receiving digital signals to and from the system device at the first data rate or at the second data rate.

18. A method comprising:
in an X2 form factor pluggable transceiver module conveying signals between a system device and a network device, determining whether the signals have a first data rate or a second data rate;
conveying one or more signals having a first data rate and corresponding to Ethernet traffic between the transceiver module and the system device via first dedicated pins of an X2 form factor pluggable connector of the transceiver module;
conveying one or more signals having a second data rate and corresponding to Ethernet traffic between the transceiver module and the system device via second dedicated pins of the X2 form factor pluggable connector of the transceiver module, wherein the second dedicated pins of the pluggable connector are distinct from the first dedicated pins of the X2 form factor pluggable connector; and
conveying signals between the transceiver module and the network device via a port device configured to receive a transmission cable, the transmission cable conveying signals at the first data rate or at the second data rate, of the transceiver module.

19. The method of claim 18, further comprising selectively conveying analog signals via the port device at the first data rate or at the second data rate; and conveying digital signals via the X2 form factor pluggable connector at the first data rate or at the second data rate.

* * * * *